No. 781,968. PATENTED FEB. 7, 1905.
J. SACHS.
DYNAMO ELECTRIC MACHINE.
APPLICATION FILED SEPT. 19, 1903.
2 SHEETS—SHEET 1.
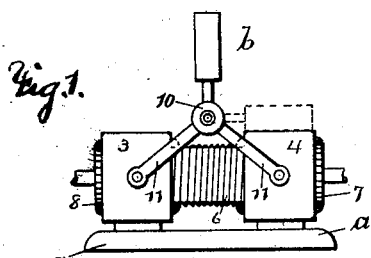
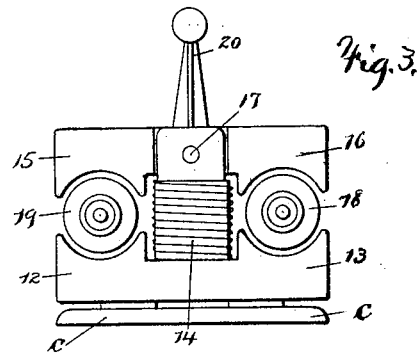
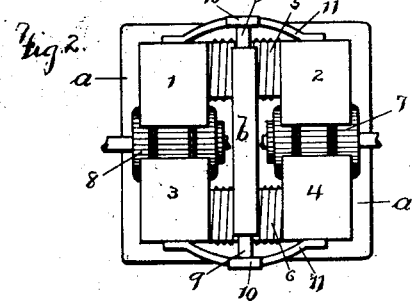
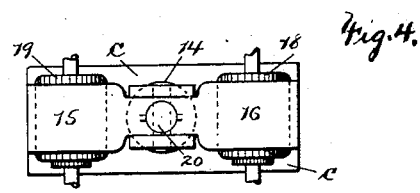
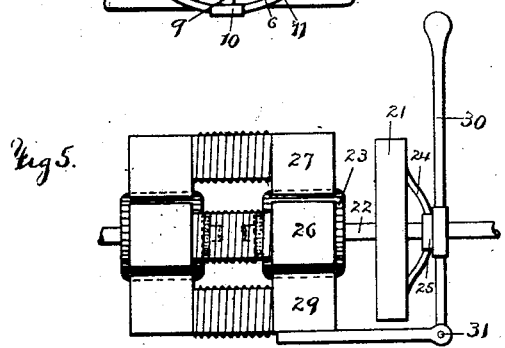
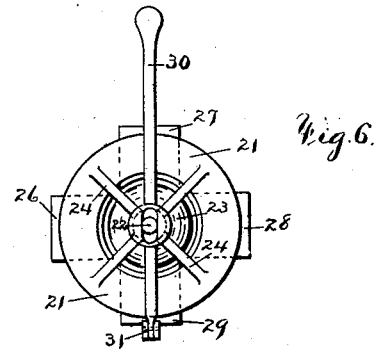
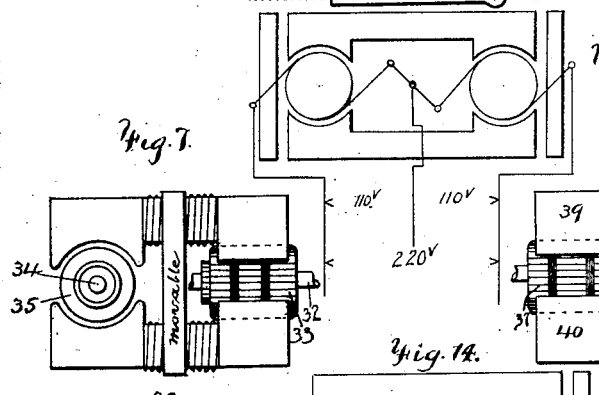
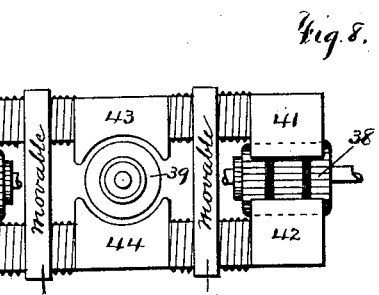
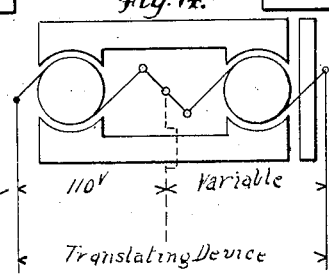
WITNESSES
INVENTOR
Joseph Sachs
PER Harold Serrell
ATTY.

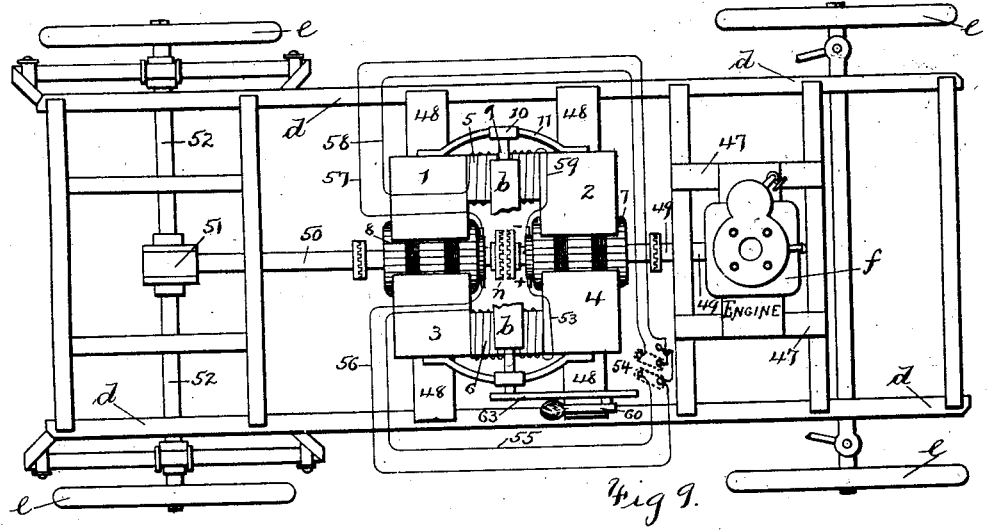
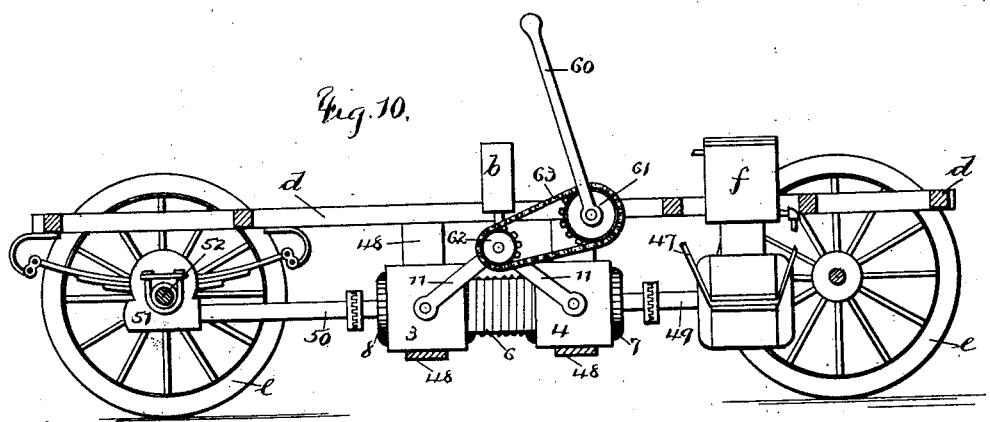
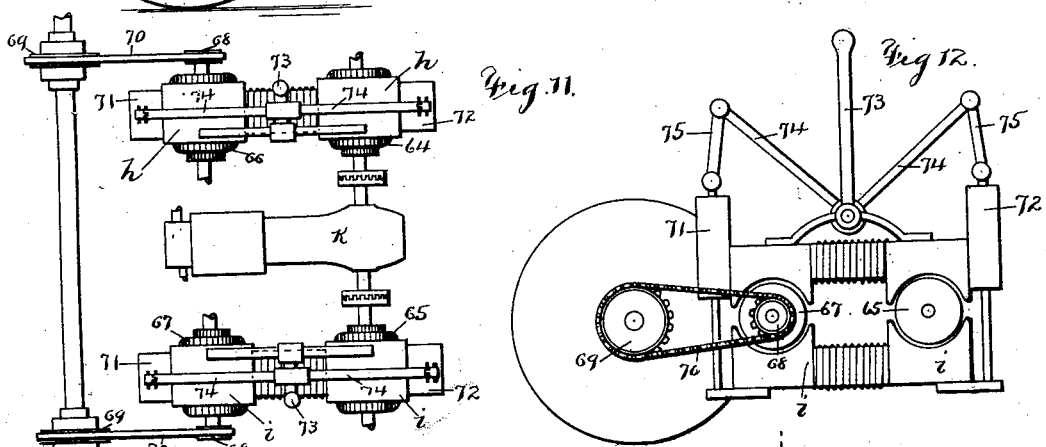

No. 781,968.

Patented February 7, 1905.

UNITED STATES PATENT OFFICE.

JOSEPH SACHS, OF HARTFORD, CONNECTICUT.

DYNAMO-ELECTRIC MACHINE.

SPECIFICATION forming part of Letters Patent No. 781,968, dated February 7, 1905.

Application filed September 19, 1903. Serial No. 173,801.

*To all whom it may concern:*

Be it known that I, JOSEPH SACHS, a citizen of the United States of America, residing at Hartford, in the county of Hartford and State of Connecticut, have invented an Improvement in Dynamo-Electric Machines, of which the following is a specification.

Heretofore dynamos have been driven by prime movers of various descriptions for generating electricity and supplying the same to electric motors coupled to devices and machines to be operated. Apparatus of this nature have been applied to motor-vehicles, to which my improved dynamo-electric machine is particularly applicable as a dynamo-motor. As separate machines were heretofore required for generator and motor, the arrangement was heavy and inefficient for this purpose.

Where hydrocarbon explosive-engines have been employed as prime movers in motor-vehicles, it has been necessary, owing to the limited torque effort of the engine, to provide mechanical gearings in varying ratios any of which may be connected at will to the engine-shaft to produce an increased or decreased torque effort at the vehicle-wheels, with an inversely-varying speed and one of the objects of my invention is to provide a dynamo-motor electric machine or electric gear applicable to motor-vehicles or other devices for transmitting power from hydrocarbon explosive-engines or other prime movers and delivering the power with inversely-variable torque and speed at the driving end without exceeding the limit of the energy output of the prime mover.

In carrying out my invention I preferably unite in one unit two armatures and a common magnetic field system having the functions of both an electric generator and an electric motor, and by employing special means for controlling and regulating the magnetic flux through one or both armatures without the use of field resistances or series-parallel switches I obtain a variation in speed and torque effort at the driving end as great as if each of the functions were developed in separate and individual machines. The armature or armatures in which the electric current is produced and those in which it is transformed into mechanical energy may be magnetically in series with each other and with the field-magnet, or they may be magnetically in parallel. In the series arrangement, which I prefer, the magnetic flux passes through the field-magnet and both armatures successively, while in the parallel arrangement it divides from the magnet-cores to the armatures. In either case it is set up by a common field coil or coils. These coils are preferably series or compound connected, but may be shunt-connected or separately excited and when once adjusted need not be varied manually to produce the variation in speed and torque at the motor end. With the magnetic series arrangement of armatures and field-magnet I preferably employ a magnetic shunt of permeable material whose magnetic reluctance is less than that of the air-gaps and cores of either armature and so arranged as to be adjustably movable toward or away from or in contact with the field-magnet pole-pieces of either the generator or motor armatures. By placing this magnetic shunt across the poles of either armature the flux through the same will be decreased in the ratio of the magnetic conductance of the air-gaps and core of that armature to the conductance of the magnetic shunt, and the total magnetic flux is increased by the lower reluctance, due to the magnetic shunt, thereby increasing the flux through the other armature. Therefore by magnetically shunting one armature its field is decreased, while that of the other is increased, and hence a drop in the voltage, due to magnetically shunting the generator-armature, causes an increased field and consequent increased torque at the motor end with a decreased voltage at the motor-armature terminals.

In ordinary systems when there is an increased load put upon the motor a decreased speed and a correspondingly-decreased counter electromotive force and an increased flow of current result, and there is therefore an increased load put upon the generator, and consequently upon the prime mover. In my improved arrangement there need be no increased load put upon the prime mover when an increased load is put upon the motor, which is made possible by reducing the flux through the generator-armature. This results in a corresponding lowering of the generated electromotive force and a consequent further decrease in the motor-armature speed until the desired current is obtained. At the same time the flux through the motor-armature core has been increased, due to a decrease in the magnetic reluctance of the field system by the shunting of the generator-armature and also due to the increased current-flow in the field-magnet coils, which has automatically increased with the increase of load and torque. Thus the increased current demanded by the increased torque is supplied at a lower generated electromotive force, although necessarily the effective electromotive force is greater. This varying of the electromotive force in inverse proportion to the current demanded by the increased load upon the motor determines and limits the watts demanded and also the load upon the engine, which is the result desired.

It is apparent that the dynamo-electric machine herein described may serve as either a multi-armature generator or motor, as well as a generator-motor or motor-generator, and the magnetic shunt-regulating devices may or may not be employed when so used. The functions of the apparatus as a generator-motor are, however, herein particularly considered.

In the drawings, Figure 1 is a side elevation of my improved dynamo-electric machine, and Fig. 2 is a plan of the same. Fig. 3 is an end elevation of a modified form of my invention, and Fig. 4 is a plan of the same. Fig. 5 is a side elevation of my invention as applied to a multipolar machine, and Fig. 6 is an elevation of the same. Figs. 7 and 8 are diagrammatic side elevations of other modifications of my invention. Fig. 9 is a plan view showing the application of my invention to a motor-vehicle, and Fig. 10 is a longitudinal sectional elevation of the same. Figs. 11 and 12 are respectively a plan and elevation of a modified application of my invention to motor-vehicles. Figs. 13 and 14 are diagrammatic views illustrating possible modified uses of my present invention.

Referring to Fig. 1, $a$ represents a suitable base upon which are mounted field-magnets comprising pole-pieces 1, 2, 3, and 4 and field-coil cores 5 and 6, the core 5 extending between and connecting the pole-pieces 1 and 2 and the core 6 extending between and connecting the pole-pieces 3 and 4. 7 and 8 represent armatures. The former, arranged to revolve between the pole-pieces 2 and 4, may be designated the "generator-armature" and the latter, arranged to revolve between the pole-pieces 1 and 3, the "motor-armature." The generator-armature terminals are connected to the motor-armature terminals, as shown in Fig. 10, and the field-coils may be wound in series or compound connected and in either case are so arranged that both the armature 7, in which the current is generated, and the armature 8, in which the current is transformed into mechanical energy, and the field-magnets are all magnetically in series—that is, the flux set up in the cores by the field-windings passes through armature 8 and air-gaps, pole-pieces 3, core 6, pole-piece 4, armature 7 and air-gaps, pole-piece 2, core 5, pole-piece 1 and back to armature 8. I also employ a bar $b$ of well-annealed iron or other permeable material, connected to arms 9, which are mounted in bearings 10, supported by a suitable frame 11, secured to the sides of the machine. This bar $b$ is normally in an upright position midway between the field-magnet pole-pieces of the generator and motor armatures, as shown in Figs. 1 and 2, and is adapted to be moved toward or away from or in contact with field-magnet pole-pieces at either the generator or motor end of the machine and being of greater permeability than the air-gaps acts as a magnetic shunt when in close relation to or in contact with either set of field-magnet pole-pieces. As hereinbefore set forth, magnetically shunting the field-magnet pole-pieces at the generator-armature end causes a decreased flux in the generator-armature, with a corresponding drop in the electromotive force. The total flux in the common magnetic circuit is, however, increased by the decreased reluctance of the same, causing increased flux through the motor-armature, which, with the increased current demanded, results in an increased torque at a decreased speed at the motor-armature end without necessitating any change in the power input from the prime mover driving the generator-armature.

In Figs. 3 and 4 I have shown a modification of my invention, wherein pole-pieces 12 and 13 are mounted on a base $c$ and have a common core-piece 14, in the upper end of which pole-pieces 15 and 16 are pivoted at 17. A generator-armature 18 is mounted to revolve between the pole-pieces 13 and 16, and a motor-armature 19 is mounted to revolve between the pole-pieces 12 and 15. In this case the armatures and their respective pole-pieces are magnetically in parallel with each other, and the magnet-field pole-pieces 15 and 16 are adapted to be adjusted on the pivot 17 by a lever 20 so as to vary the width of the air-gap of either the generator or motor armature to cause an increased reluctance of one air-gap and a correspondingly-decreased flux through its armature and a decreased reluctance of the other air-gap and correspondingly-increased flux through its armature to produce the results hereinbefore described.

In multipolar machines (see Figs. 5 and 6) I may employ an annular ring 21, through which the shaft 22 of the generator-armature 23 passes and which is supported by arms 24, connected to a sleeve 25, fitting the shaft 22. The ring 21 may be moved away from, toward, or placed in contact with the field-magnet pole-pieces 26 27 28 29 to magnetically shunt the generator-armature by means of a lever 30, pivoted at 31 and spanning the shaft 22 and slidably connected to the collar 25.

It will now be apparent that while in the hereinbefore-described examples of my invention the shafts of the generator and motor armatures are shown parallel to one another circumstances may require that these parts bear another relation to each other. In Fig. 7 I have illustrated a machine wherein the shaft 32 of the generator-armature 33 is at right angles to the shaft 34 of the motor-armature 35, the field-magnet pole-pieces of both armatures, the field-cores, and both armatures being magnetically in series, as described in connection with Figs. 1 and 2, and provided with a magnetic shunt-bar (shown diagrammatically at 36) for the purposes hereinbefore set forth. As shown in Fig. 8, it is also within the spirit of my invention to employ two motor-armatures 37 38, whose shafts are in alinement, and a common generating-armature 39, whose shaft is at right angles with those of the motor-armatures, in which case the motor-armatures 37 and 38, with their respective magnet pole-pieces 39 40 and 41 42, are each magnetically in series with the armature 39 and its field-poles 43 44, the usual magnetic shunts (shown diagrammatically at 45 46) being employed for regulating purposes. It will also be apparent that in this design any two of the armatures may be connected up to operate without the third one and that when any two of the armatures are so employed the magnetic system will be a continuous and not a divided one. It is also apparent that the central armature may act as the motor-armature and the two other armatures as generators.

Referring to Figs. 9 and 10, in which I have shown the application of my invention to motor-vehicles, $d$ represents the frame of a motor-vehicle, suitably mounted on wheels $e$. $f$ is a hydrocarbon-engine or other prime mover mounted on suitable supports 47, and this engine may be automatically governed to maintain a fixed speed, or its speed may be under the control of the driver of the vehicle. In these figures (9 and 10) I have illustrated the type of dynamo-motor shown in Figs. 1 and 2, and the characters of reference used in Figs. 1 and 2 are employed in Figs. 9 and 10 to designate similar parts, with the exception of the base. The field-magnets are mounted on suitable supports 48, and 1 2 3 4 are the field-magnet pole-pieces, 5 and 6 the cores, and 7 and 8 the armatures, as described in connection with Figs. 1 and 2, the shaft of the armature 7 being connected to the shaft 49 of the engine $f$ and the shaft of the armature 8 being connected to a shaft 50 in connection with a differential gear 51 and the driving-shafts 52 52. As hereinbefore stated, the flux set up by the field-coils will pass through the armatures, air-gaps, field pole-pieces, and cores, making a complete series magnetic circuit. The armature 7 rotates in the magnetic field of the field-poles 2 and 4, and assuming the generator-armature terminals are "plus" and "minus," as marked, the current will pass through wire 53 to the field-coils on core 6, thence to a circuit opening and reversing switch 54 by wire 55, by wire 56 to the motor-armature 8, thence by wire 57 to the switch 54, thence by wire 58 to the field-coil on core 5, and thence to the minus-terminal of the generator-armature by wire 59, or to reverse the motor the current may be passed by throwing over the switch through the wire 57 to the motor-armature, wire 56, switch 54, wire 58, field-coil on core 5, and wire 59 to the minus-terminal of the generator-armature. The reversing switch above described may be of well-known construction—that is, in its normal position the central movable portion is in such position that the circuit between the two armatures is open. When thrown one way, it connects the armatures so as to produce motion in one direction, and when thrown in the other direction it connects them so as to produce the opposite motion by causing the current to flow through the motor-armature, as already described. I may employ separate closing and reversing switches instead of embodying both functions in one switch device, or, in fact, any other arrangements whereby the same result is accomplished. The annealed-iron bar $b$, mounted in bearings 10 and normally in the midway position between the pole-pieces of the armatures, may swing, by means of a lever 60, sprockets 61 and 62 and a chain 63, passing over the same, so as to lie flat across the pole-pieces at either the generator or motor end of the machine, thus forming a magnetic shunt to the path of the flux through the armature acted on. The shafts of the motor and dynamo armatures are normally disconnected, and the adjacent ends of the same are provided with the members of a friction or other clutch $n$, adapted to connect said shafts in order that in case of necessity the engine may drive the vehicle directly through said shafts.

In Figs. 11 and 12 I have shown a modification of my invention as applied to motor-vehicles and in which the differential gear is dispensed with, but which necessitates the use of two dynamo-motor machines $h$ $i$, whose armatures 64 and 65 are driven directly by a hydrocarbon-engine or other prime mover $k$ and whose motor-armatures 66 and 67 are connected to the shafts of the driving-wheels on opposite sides of the vehicle by sprockets 68 and 69 and chains 70 or otherwise. In this case magnetic shunts 71 72 are preferably arranged to slide vertically at the ends of the machine and may be operated by a lever 73, acting through arms 74 and links 75.

In operating a motor-vehicle equipped with my dynamo-electric machines used as a gear the method of procedure is as follows: Normally the magnetic shunt is in its midway position and the circuit closing and reversing switch in the open position, so that there is no connection between the two armatures. The hydrocarbon-engine is first started and permitted to attain its proper speed, and then it is desirable to place the magnetic shunt in proximity to or in contact with the generator-armature, after which the circuit closing and reversing switch is operated in the proper direction, so that the current passes from the generator-armature through the motor-armature in the direction necessary to produce the desired motion in the motor-armature. The result will be that the generator-armature will generate a current of low electromotive force, which passing through the motor-armature will enable it to start the vehicle at a low speed. The field in which the motor-armature is operating will be strengthened due to the placing of the magnetic shunt across the generator-armature pole-pieces, and this, in conjunction with the larger current due to starting, will give the necessary torque; but at the same time the total watt energy delivered by the generator-armature will not be excessive, owing to the low electomotive force which it is generating. As the vehicle now comes up to speed the magnetic shunt across the generator-armature pole-pieces is gradually removed, thus increasing the voltage generated in the generator-armature, and consequently the speed of the motor-armature. The flux through the motor-armature has at the same time been slightly decreased, owing to the removal of the magnetic shunt across the generator-armature pole-pieces, and the vehicle is thus gradually brought up to speed. If it is now desired to still further weaken the field in which the motor-armature is operating, so as to still further increase the speed, the magnetic shunt across the motor-armature pole-pieces can be brought into proximity to or in contact with these pole-pieces, and thus weaken the flux through the motor-armature, consequently increasing its speed. Should it be desired to reverse the vehicle, the magnetic shunts are first placed in contact with the generator-armature pole-pieces. This greatly lowers or entirely nullifies the electromotive force generated by the generator-armature and due to the elimination of the magnetic flux passing through it, which in consequence also results in a cessation of motion in the motor-armature. After this has been accomplished the circuit closing and reversing switch is thrown in the opposite direction, and the manipulation of the magnetic shunts across the pole-pieces then proceeds as previously described. As I have already stated, the prime mover or hydrocarbon-engine may have its speed controlled manually, or it may be automatically controlled by properly governing the throttle and the sparking elements of the engine.

While I have particularly described the operation of my improved dynamo-electric machine in connection with its use as a dynamo-motor for the purpose of transmitting or transforming mechanical energy from prime movers at variable speed and torque, yet, as I have hereinbefore stated, it has many advantages for use as a multiarmature motor or dynamo or as a motor-dynamo for the various purposes for which such machines are used. The use of my improved dynamo-electric machine as a two-armature dynamo for three-wire systems or as a multiple-voltage dynamo for motor-controller or as a booster or bucker dynamo or motor is obvious, as shown diagrammatically in Figs. 13 and 14.

It will be understood that I do not in any way limit myself to any particular application of my improved dynamo-electric machine so long as the general principles in the manipulation of the armatures described hereinbefore are used.

I claim as my invention—

1. In a dynamo-motor electric machine, and in combination, a generator-armature, a motor-armature, a common magnetic system in which both said armatures operate, a common source of magnetomotive force, and means other than said source of magnetomotive force for magnetically strengthening the flux through either of said armatures at the expense of the flux through the other.

2. In a dynamo-electric machine, and in combination, two armatures, a common magnetic circuit in which both armatures operate, a common source of magnetomotive force, and means other than said source of magnetomotive force for magnetically strengthening the flux through either of said armatures at the expense of the flux through the other.

3. In a dynamo-electric machine, and in combination, two armatures, a magnetic circuit in which both armatures permanently operate in series magnetically, and means for magnetically strengthening the flux through either of said armatures at the expense of the flux through the other.

4. In a dynamo-electric machine, and in combination, two armatures, a magnetic circuit in which both armatures operate in series magnetically, a common source of magnetomotive force, and means other than said source of magnetomotive force for magnetically strengthening the flux through either of said armatures at the expense of the flux through the other.

5. In a dynamo-electric machine, and in combination, two armatures, a magnetic circuit in which both armatures operate, a source of magnetomotive force fixed in its relationship to said magnetic circuit and means for magnetically strengthening the flux through either of said armatures at the expense of the flux through the other.

6. In a dynamo-electric machine and in combination, two armatures, a magnetic circuit in which both armatures operate, a common field-magnet, and other means for magnetically strengthening the flux through either of said armatures at the expense of the flux through the other.

7. In a dynamo-motor electric machine, and in combination, a generator-armature, a motor-armature with a common magnetic flux passing through both said armatures, a source of magnetomotive force and other means for magnetically strengthening the flux through either of said armatures at the expense of the flux through the other.

8. In a dynamo-motor electric machine, and in combination, a generator-armature, a motor-armature, a common magnetic field system in which both said armatures operate, a common source of magnetomotive force, a magnetic shunt, and means for moving the same from, toward, or in contact with the field-poles of either of said armatures to strengthen the flux in one of the armatures at the expense of that in the other.

9. In a dynamo-motor electric machine, and in combination, a generator-armature, a motor-armature, a common magnetic field system in which both said armatures operate, a common source of magnetomotive force, a magnetic shunt, and means for moving the same from, toward, or in contact with the field-poles of either of said armatures to strengthen the flux in one of the armatures at the expense of that in the other without varying the number of the magnet-coils.

10. In a dynamo-electric machine, the combination with a generator and a motor armature, of a field-magnet magnetically in series with both said armatures, and other means whereby the electromotive force of the generator-armature supplied to the motor-armature may be varied without varying the number of the field-coils.

11. In a dynamo-electric machine, the combination with a generator and a motor armature, of a field-magnet magnetically in series with both said armatures, means whereby the electromotive force of the generator-armature supplied to the motor-armature may be varied without varying the number or position of the field-coils, and without increasing the power input supplied to the generator-armature.

12. In a dynamo-electric machine, the combination with a generator-armature, a motor-armature and a series magnetic circuit in which both armatures operate, of means other than said circuit for magnetically shunting either armature, thereby increasing the flux through the other armature.

13. In a dynamo-electric machine, the combination with a generator-armature, a motor-armature and a series magnetic circuit in which both armatures operate, of means other than said circuit for magnetically increasing the flux through one armature and decreasing the flux through the other armature.

14. In a dynamo-electric machine, the combination with a generator-armature and motor-armature operating in separate magnetic fields in a common magnetic circuit, of a magnetic shunt for shunting the magnetic flux around either of said armatures.

15. In a dynamo-electric machine, the combination with a generator-armature, and a motor-armature supplied with current by said generator-armature both operating in separate fields in a common magnetic field system, of means for magnetically varying the flux in the generator-armature and inversely in the motor-armature, substantially as specified.

16. In a dynamo-electric machine, the combination with a generator-armature and a motor-armature supplied with current by said generator-armature both operating in separate fields in a common magnetic field-circuit, of means for magnetically varying the flux in the generator-armature and inversely in the motor-armature to cause an increased torque effect at reduced speed at the motor end without varying the number of the field-coils and without increasing the input required by the generator-armature.

17. In a dynamo-electric machine, the combination with a generator-armature and a motor-armature both operating in separate fields in a common magnetic field system, of a magnetic shunt for magnetically varying the flux in the generator-armature and inversely in the motor-armature to cause an increased torque effect at reduced speed at the motor end without varying the number of the field-coils and without increasing the input required by the generator-armature.

18. In a dynamo-electric machine, the combination with a generator-armature and a motor-armature both operating in separate fields in a common magnetic field system, of a magnetic shunt for magnetically varying the flux in the generator-armature and inversely in the motor-armature to cause an increased torque effect at reduced speed at the motor end without varying the number of the field-coils and without increasing the input required by the generator-armature, and means for operating said magnetic shunt.

19. In a dynamo-electric machine, the combination with a common field-magnet system and a common source of magnetomotive force, of at least two armatures, and means whereby the power delivered by one armature is affected by varying the magnetic flux through the other without changing the relationship of said source of magnetomotive force, to said magnetic field system.

20. In a dynamo-electric machine and in combination, a generator-armature, a motor-armature with its axis at an angle to that of said generator-armature, a common magnetic system in which both of said armatures operate, a common source of magnetomotive force and means for strengthening the magnetic flux through either of said armatures separately.

21. In a dynamo-electric machine and in combination, a generator-armature, a motor-armature with its axis at an angle to that of said generator-armature, a series magnetic circuit in which both of said armatures operate, and means for strengthening the magnetic flux through either of said armatures separately.

22. In a dynamo-electric machine and in combination, a generator-armature, a motor-armature with its axis at an angle to that of said generator-armature, a series magnetic circuit in which both of said armatures operate, a common source of magnetomotive force, and means for strengthening the magnetic flux through either of said armatures separately.

23. In a dynamo-motor electric machine and in combination, a generator-armature, a motor-armature, a common magnetic system in which both of said armatures operate, a common source of magnetomotive force, and means other than said source for varying the ratio of the fluxes through the armatures.

24. In a dynamo-electric machine and in combination, two armatures, a magnetic circuit in which both of said armatures operate, a common source of magnetomotive force, and means other than said source for varying the ratio of the fluxes through the armatures.

25. In a dynamo-electric machine and in combination, two armatures, a magnetic circuit in which both of said armatures operate in series magnetically, a common source of magnetomotive force, and means other than said source for varying the ratio of the fluxes through the armatures.

26. In a dynamo-motor electric machine and in combination, a generator-armature, a motor-armature, a common source of magnetic flux which flux passes through both of said armatures and means other than said source for varying the ratio of the fluxes through the armatures.

27. In a dynamo-motor electric machine and in combination, two armatures, whose axes are at an angle to one another, separate field-magnet poles for each armature, a common magnetic flux passing through both of said armatures and a common source of magnetomotive force.

28. In a dynamo-electric machine, two armatures whose axes are at an angle to one another and a common magnetic system producing a separate field for each armature.

29. In a dynamo-electric machine, two armatures whose axes are at right angles to one another, means for producing a separate magnetic field for each armature, and means for effecting a variation in either of said magnetic fields.

30. In a dynamo-electric machine, two armatures whose axes are at right angles to one another, and a common means for producing a separate magnetic field for each armature.

31. In a dynamo-electric machine, a generator-armature, a motor-armature supplied with current by said generator-armature, a common means for producing a magnetic field for each armature, and means for effecting a variation in the generator-voltage to meet the demands of the motor-armature.

32. In combination, a generator-armature, a motor-armature supplied with current by said generator-armature, means for producing a separate magnetic field in which each armature operates, and means for inversely controlling the magnetic fields at the will of the operator.

33. In combination, two armatures, a common means for producing a separate magnetic field for each armature, and unitary means other than the aforesaid means for inversely controlling said magnetic fields.

34. In a field system for dynamo-electric machines, a common source of magnetomotive force, pole-pieces for producing at least two magnetic fields, and means other than said source for inversely varying the said magnetic fields.

35. In a dynamo-electric machine, two or more armatures, means for producing a magnetic field, and means other than the aforesaid means for effecting an inversely-varying flux through said armatures.

36. In combination, a generator-armature, a motor-armature, means for producing a variable magnetic field for each armature, and means other than the aforesaid means for inversely controlling the said magnetic fields.

Signed by me this 12th day of September, 1903.

JOSEPH SACHS.

Witnesses:
 GEO. T. PINCKNEY,
 A. H. BERRELL.